(12) United States Patent
Bosshart et al.

(10) Patent No.: US 11,283,709 B2
(45) Date of Patent: Mar. 22, 2022

(54) NETWORK FORWARDING ELEMENT WITH DATA PLANE PACKET SNAPSHOTTING CAPABILITIES

(71) Applicant: Barefoot Networks, Inc., Santa Clara, CA (US)

(72) Inventors: Patrick Bosshart, Plano, TX (US); Michael G. Ferrara, Palo Alto, CA (US); Jay E. S. Peterson, San Francisco, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 3 days.

(21) Appl. No.: 16/687,278

(22) Filed: Nov. 18, 2019

(65) Prior Publication Data

US 2020/0162372 A1    May 21, 2020

Related U.S. Application Data

(63) Continuation of application No. 15/682,332, filed on Aug. 21, 2017, now Pat. No. 10,511,523.

(Continued)

(51) Int. Cl.
*H04L 12/26* (2006.01)
*H04L 45/00* (2022.01)
(Continued)

(52) U.S. Cl.
CPC ............ *H04L 45/38* (2013.01); *G06F 9/4498* (2018.02); *H04L 43/04* (2013.01); *H04L 45/54* (2013.01);
(Continued)

(58) Field of Classification Search
CPC ...... H04L 47/10; H04L 47/22; H04L 47/2441; H04L 47/2475; H04L 41/06; H04L 47/31; H04L 47/32; H04L 49/1546
(Continued)

(56) References Cited

U.S. PATENT DOCUMENTS

| 8,681,794 B2 * | 3/2014 | Hill | H04L 63/0245 |
| | | | 370/392 |
| 8,762,501 B2 * | 6/2014 | Kempf | H04L 47/781 |
| | | | 709/220 |

(Continued)

OTHER PUBLICATIONS

Final Office Action for U.S. Appl. No. 15/682,332, dated Apr. 16, 2019, 9 pages.
(Continued)

*Primary Examiner* — Dmitry Levitan
(74) *Attorney, Agent, or Firm* — Essential Patents Group, LLP.; Christopher K. Gagne

(57) ABSTRACT

A forwarding element includes data plane forwarding circuitry for forwarding data messages received by the forwarding element to other network elements in a network. The data-plane forwarding circuitry includes several snapshot-match circuitry units. Each snapshot-match circuitry unit compares a set of header fields of incoming data messages with a corresponding matching data. The data-plane forwarding circuitry also includes several snapshot-capture circuitry units. Each snapshot-capture circuitry units stores a set of header fields of data messages that matches a corresponding matching data.

17 Claims, 7 Drawing Sheets

Related U.S. Application Data

(60) Provisional application No. 62/525,721, filed on Jun. 27, 2017, provisional application No. 62/505,985, filed on May 15, 2017.

(51) Int. Cl.
*H04L 69/22* (2022.01)
*H04L 45/745* (2022.01)
*H04L 47/2441* (2022.01)
*H04L 49/00* (2022.01)
*H04L 43/04* (2022.01)
*G06F 9/448* (2018.01)
*H04L 45/74* (2022.01)

(52) U.S. Cl.
CPC ............ *H04L 45/74* (2013.01); *H04L 45/745* (2013.01); *H04L 47/2441* (2013.01); *H04L 49/3063* (2013.01); *H04L 69/22* (2013.01)

(58) Field of Classification Search
USPC .............................. 370/229, 230.1, 235, 236
See application file for complete search history.

(56) References Cited

U.S. PATENT DOCUMENTS

| | | | |
|---|---|---|---|
| 8,964,569 B2 | 2/2015 | Jocha et al. | |
| 8,971,338 B2 | 3/2015 | Mishra et al. | |
| 9,258,224 B2 * | 2/2016 | Bosshart | H04L 45/745 |
| 9,503,321 B2 * | 11/2016 | Neginhal | H04L 41/0806 |
| 9,686,162 B2 | 6/2017 | Singh et al. | |
| 9,736,057 B2 | 8/2017 | Chinni et al. | |
| 9,998,352 B2 | 6/2018 | Liang et al. | |
| 10,305,783 B2 * | 5/2019 | Cai | H04L 45/745 |
| 10,516,626 B1 * | 12/2019 | Kodeboyina | H04L 45/74 |
| 10,587,491 B1 * | 3/2020 | Volpe | H04L 43/10 |
| 10,645,029 B1 * | 5/2020 | Watson | G06F 13/385 |
| 10,659,571 B1 * | 5/2020 | Volpe | H04L 69/324 |
| 10,666,775 B1 * | 5/2020 | Volpe | H04L 43/18 |
| 2008/0201772 A1 * | 8/2008 | Mondaeev | H04L 63/20 726/13 |
| 2012/0246630 A1 | 9/2012 | Kuzins et al. | |
| 2016/0094383 A1 | 3/2016 | Wang et al. | |
| 2016/0330111 A1 | 11/2016 | Manghirmalani et al. | |
| 2017/0251065 A1 | 8/2017 | Furr et al. | |
| 2017/0257388 A1 | 9/2017 | Addepalli et al. | |
| 2017/0339109 A1 | 11/2017 | Zeng et al. | |
| 2017/0346766 A1 | 11/2017 | Dutta | |
| 2018/0006833 A1 | 1/2018 | Tatlicioglu et al. | |
| 2018/0013630 A1 | 1/2018 | Tatlicioglu et al. | |
| 2018/0069786 A1 | 3/2018 | Lokman et al. | |
| 2018/0288145 A1 | 10/2018 | Levy et al. | |
| 2019/0260641 A1 | 8/2019 | Giust et al. | |
| 2019/0288905 A1 | 9/2019 | Wang et al. | |

OTHER PUBLICATIONS

First Office Action for U.S. Appl. No. 15/682,322, dated Oct. 30, 2018, 8 pages.
First Office Action for U.S. Appl. No. 15/980,543, dated Nov. 14, 2019, 13 pages.
Non-Published commonly owned U.S. Appl. No. 15/682,332, filed Aug. 21, 2017, 32 pages, Barefoot Networks, Inc.
Open Flow Switch Specification, Version 1.3.3, Open Network Foundation, Sep. 2013, 164 pages.
Final Office Action for U.S. Appl. No. 15/980,543, dated Jul. 2, 2020.
Notice of Allowance for U.S. Appl. No. 15/980,543, dated Oct. 14, 2020.
Notice of Allowance for U.S. Appl. No. 15/682,332, dated Jul. 29, 2019.

* cited by examiner

NETWORK FORWARDING ELEMENT WITH DATA PLANE PACKET SNAPSHOTTING CAPABILITIES

CLAIM OF BENEFIT TO PRIOR APPLICATIONS

This Application is a Continuation of and claims the benefit of U.S. Non-Provisional patent application Ser. No. 15/682,332 filed Aug. 21, 2017 which in turn claims the benefit of U.S. Provisional Patent Application 62/525,721 filed Jun. 27, 2017 and U.S. Provisional Patent Application 62/505,985, filed May 15, 2017. The contents of all of which are hereby incorporated by reference.

BACKGROUND

Network forwarding elements, such as switches and routers, commonly have control and data plane components. The data plane component handles the forwarding of the data packets that the forwarding element receives. The control plane component provides an interface for configuring the data plane component.

The control plane is implemented by a software layer that is executed by one or more general purpose processors (e.g., CPUs) of the forwarding element. The data plane of the forwarding elements, on the other hand, is often implemented as a pipeline of flow tables that are used to process the incoming data messages (e.g., network packets).

Debugging of the control plane operations can be done by traditional methods of placing break points in the software executed by the processors. The execution stops when a specific line of code is executed and the status and contents of different memory locations are examined. Debugging of the data plane, on the other hand, requires examining packets that flow through the forwarding element.

In a hardware forwarding element, the data message processing of the data plane is done by a series of table lookups implemented in hardware and/or firmware without the use of the forwarding element's processor. Debugging of the data plane operations, therefore, cannot be performed by the traditional methods of debugging software programs.

SUMMARY

Some embodiments of the invention provide a network forwarding element (e.g., a hardware forwarding element such as a switch, a router, etc.) that has a data plane, message-processing pipeline with snapshot debug hardware circuits. The forwarding element's data plane snapshot debug circuitry, when triggered, copies a snapshot of specified data for a data message (e.g., a network packet) that is processed in the data plane of the forwarding element.

The forwarding element of some embodiments has multiple data ports for receiving and sending data messages in order to forward messages to the data compute nodes and/or to other network forwarding elements in the network fabric. The forwarding element of some embodiments has several message-processing pipelines, each with multiple message-processing stages. Each data plane message-processing stage in some embodiments includes message-forwarding circuitry for processing received data messages for forwarding to data compute nodes and/or to other network forwarding elements.

The message-forwarding circuitry of each message-processing stage in some embodiments includes a match-action unit (MAU) that has a match sub-unit and an action sub-unit. In some embodiments, the match sub-unit compares one or more fields in a received message's header to identify flow entries in one or more match tables to identify one or more matching flow entries (i.e., entries that match the message's header values), while the action sub-unit performs the action or actions of the identified flow entries. The actions performed by the action units of the MAUs include actions that the forwarding element has to perform on a received data message to forward it to its destination compute node or to other intervening forwarding elements.

The snapshot debug circuitry in some embodiments includes several functionalities for (i) enabling and arming snapshots, reading out captured data, and re-enabling and rearming for the next capture, (ii) detecting the condition which triggers the data capture snapshot, (iii) storing the set of data words captured in the snapshot, and (iv) notifying the CPU via interrupt when a snapshot occurs.

The forwarding element of some embodiments includes a parser that extracts a message header from a received data message. As further described below, the extracted header in some embodiments is in a format of a packet header vector (PHV), which can be modified by successive message processing stages as part of their message processing operations. When the forwarding element finishes processing a data message and is ready to send this data message to its destination compute node or next forwarding element, a deparser of the forwarding element in some embodiments produces the data message header from the PHV of the last message processing stage, and combines this header with the data message's payload (which can be a null payload) for transmission.

The snapshot debug circuits in some embodiments include a snapshot match unit and a snapshot capture unit in each message-processing stage of the forwarding element. In some embodiments, the snapshot is triggered by comparing the value of the PHV at one or more message-processing stages of the forwarding element with a corresponding match value. The match value in some embodiments is a ternary value (i.e., includes "don't care" bits) and is compared against the entire PHV. The match value at each stage may be different than the match value at other stages.

The snapshot is further triggered in some embodiments if the snapshot has been triggered at a preceding stage. The snapshot in some embodiments is also triggered based on time. These embodiments include a counter in each MAU stage that starts counting when the time-based snapshot is enabled in the stage.

When a snapshot is triggered in a stage, the output PHV associated with the stage is captured. The snapshots are read into a set of registers and the forwarding element's CPU is notified by an interrupt. The CPU can read or ignore any snapshot data in each stage. Resetting the snapshot state by the CPU makes the stage ready for the next snapshot.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a network forwarding element (e.g., a switch, a router, etc.) that has a data plane and a message-processing pipeline with snapshot debug hardware circuits. The forwarding element's data plane snapshot debug circuitry, when triggered, copies a snapshot of specified data for a data message (e.g., a network packet) that is processed in the data plane of the forwarding element. The data captured in a snapshot may include some or all fields of a data message header, the status of more of more data plane signals, and/or the contents of different memory locations and registers in the data plane.

I. Data Plane Snapshotting

As used in this document, data messages refer to a collection of bits in a particular format sent across a network. One of ordinary skill in the art will recognize that the term data message may be used herein to refer to various formatted collections of bits that may be sent across a network, such as Ethernet frames, IP (Internet protocol) packets, TCP (transmission control protocol) segments, UDP (user datagram protocol) datagrams, etc.

Figure 1:
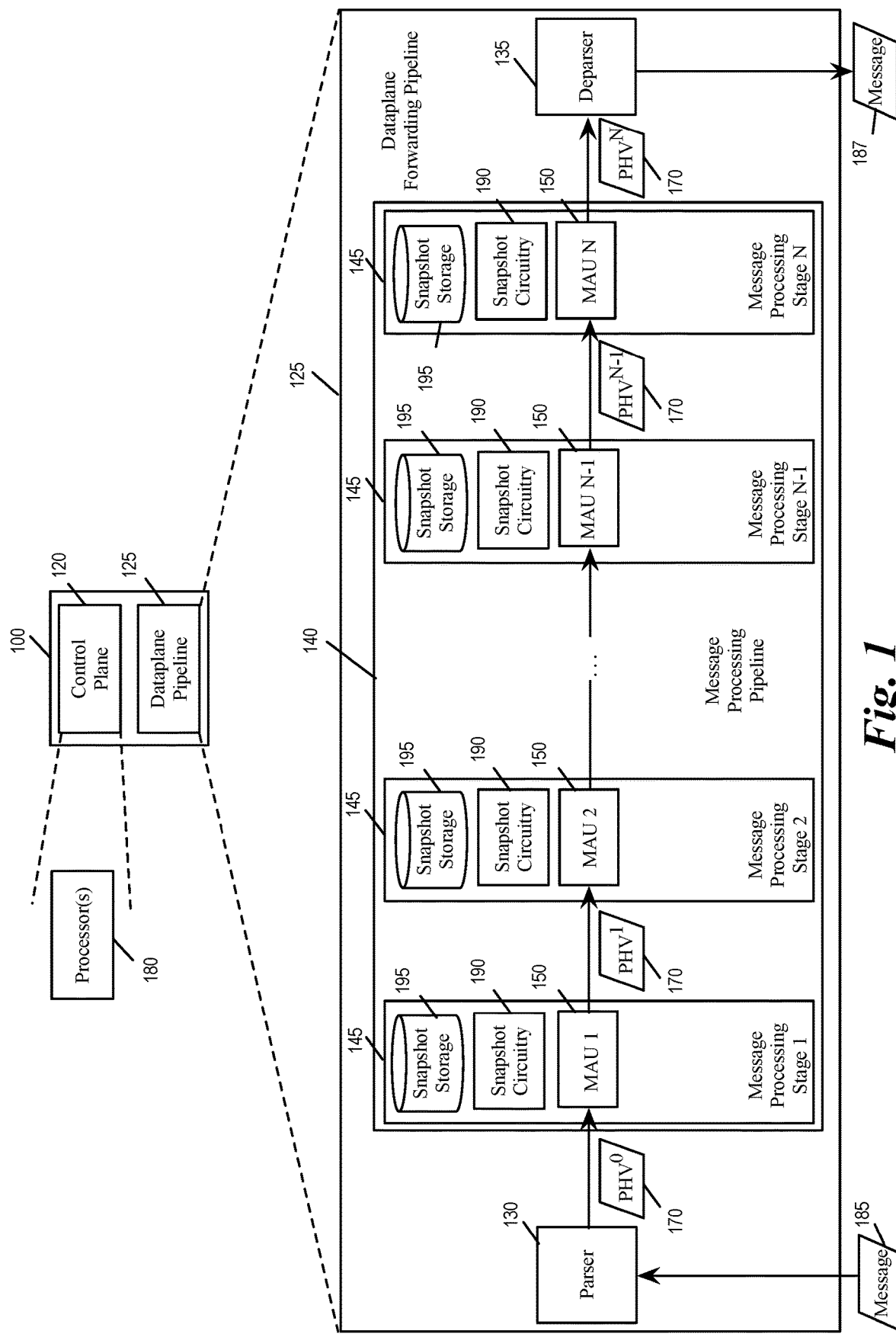
FIG. 1 conceptually illustrates an example of a forwarding element with snapshot debug hardware circuits in some embodiments of the invention.

FIG. 1 conceptually illustrates an example of a forwarding element 100 with snapshot debug hardware circuits in some embodiments of the invention. The forwarding element 100 has a data plane and a control plane. The data plane pipeline 125 includes forwarding circuits (e.g., switching circuits, routing circuits, etc.) for processing and forwarding messages received at the ports of the forwarding element.

The control plane 120 configures the forwarding circuits of the data plane. In some embodiments, the control plane 120 is implemented by a control software layer that is executed by one or more general purpose processors 180 (e.g., CPUs (central processing units)) of the forwarding element, while the data plane pipeline 125 is implemented by forwarding circuits that are custom built (e.g., ASICs (application specific integrated circuits)) for performing forwarding operations at very fast line rates.

As shown, the forwarding element of some embodiments includes a parser 130, a deparser 135, and a multi-stage message-processing pipeline 140. Each message-processing stage 145 includes a match-action unit (MAU) 150 and a corresponding snapshot circuitry 190. As described below, the snapshot circuitry is used to match different fields in the header of data messages that are processed by the message-processing pipeline 140. The snapshot storage 195 includes storage (e.g., registers or memory) for saving matching criteria received from the processing unit 180 and saving different information (such as one or more fields of the data message header or the status of different signals in the pipeline) once a matching criteria is met.

The parser 130 extracts a message header from a received data message 185. In some embodiments, the extracted header is in the format of a packet header vector (PHV) 170, which can be modified by successive message processing stages of the message-processing pipeline 140. In some embodiments, each header vector sequentially passes through several message-processing stages including a set of ingress message-processing stages (or ingress pipeline) and a set of egress message-processing stages (or egress pipeline) that respectively are before and after a traffic manager of the data plane. The traffic manager includes queues that store the data messages (including their associated header vectors) and the network forwarding element's switching fabric that acts as a crossbar switch for directing data messages between the input and output ports of the network forwarding element.

The snapshot circuitry 190 uses the header fields in the PHV 170 to match with a given matching criteria. The snapshot circuitry 190 saves some or all header fields from the PHV 170 in the snapshot storage 195 once the matching criteria is met by the header fields in the PHV.

In some embodiments, the parser includes modules such as a header identification module, a ternary content-addressable memory (TCAM) module, and a field extraction module for identifying various fields of the packet header and extracting the corresponding fields' data to create the PHV. As shown, each message processing stage receives an input PHV, processes the PHV, and sends out (either to the next stage or to the deparser 135 if the stage is the last stage in the pipeline) an output PHV which becomes the input PHV of the next stage (or the deparser). Each message processing stage may change the PHV by changing one or more fields of the PHV or may send out the PHV unchanged.

The deparser 135 produces the data message header from the PHV of the last message processing stage, and reconstitutes the data message (e.g., combines the header with a payload) when the forwarding element finishes processing the data message and is ready to send this data message 187 to its destination compute node or next forwarding element. The data message 187 that is sent out may or may not be the same as the corresponding data message 185 that the forwarding element receives depending on the processing done on the PHV at different stages 145 of the pipeline 140.

In some embodiments, the pipeline is a synchronous pipeline that has its components operate at a minimum clock rate (e.g., at the line rate). Each message-processing stage in some embodiments includes message-forwarding circuitry for processing received data messages for forwarding to data compute nodes and/or to other network forwarding elements.

B. Snapshot Circuitry

Figure 2:
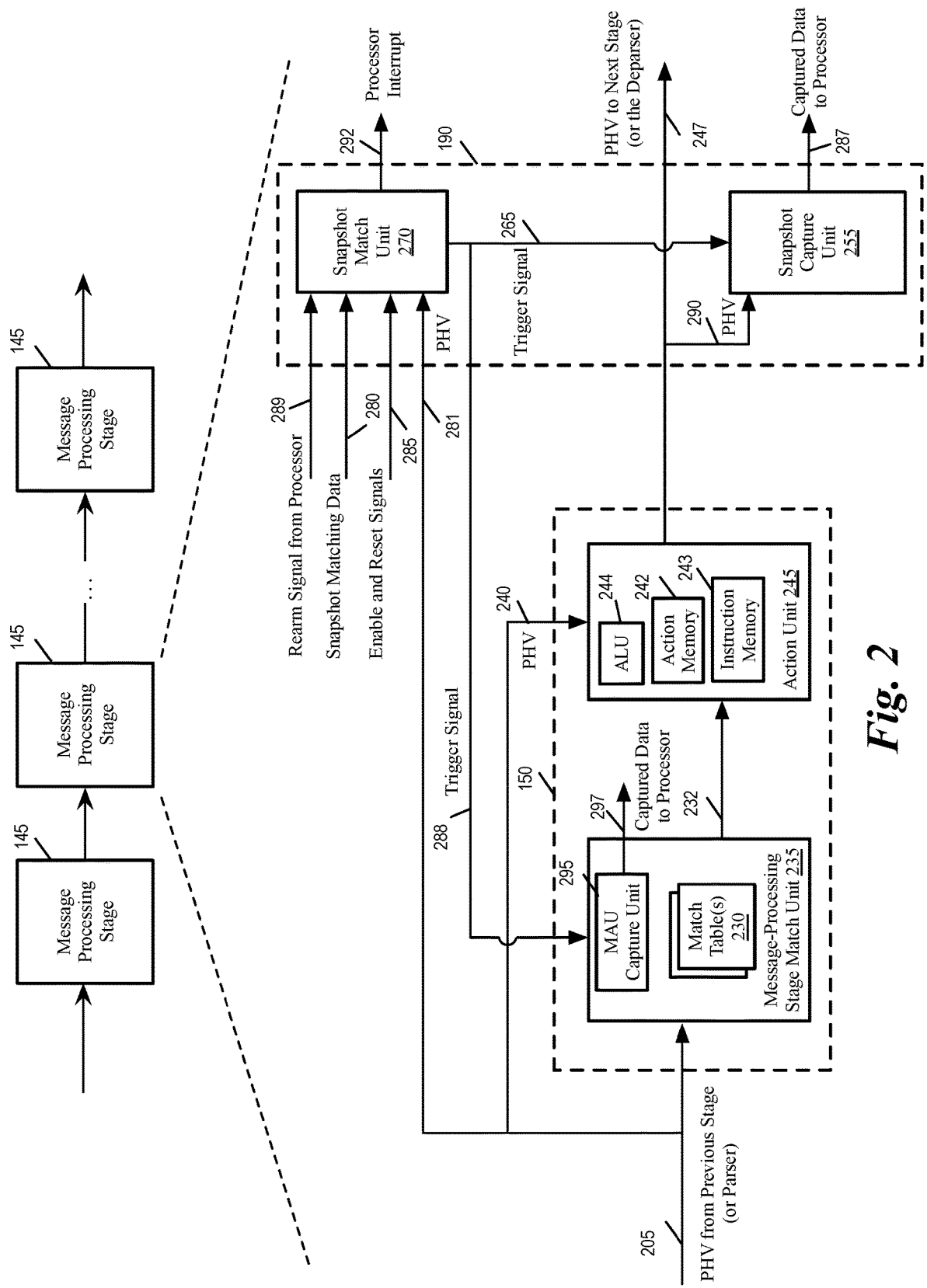
FIG. 2 conceptually illustrates a message-processing stage of a forwarding element of some embodiments that includes snapshot circuitry.

FIG. 2 conceptually illustrates a message-processing stage of a forwarding element of some embodiments that includes snapshot circuitry. The message-processing stage can be in the ingress pipeline or the egress pipeline. As shown, the message-forwarding circuitry of the message-processing stage 145 includes a match-action unit (MAU) 150 that has a match unit 235 and an action unit 245. The message-processing stage 145 also includes snapshot debug hardware circuits 190 that include a snapshot match unit 270 and a snapshot capture unit 255.

In some embodiments, the physical hardware resources of a message-processing stage is partitioned such that a portion of the stage is used in the ingress pipeline and the other portion is used in the egress pipeline of the forwarding element. In these embodiments, the snapshot circuit includes hardware resources to independently take snapshots for the ingress and egress portions of the message-processing stage.

The match unit 235 includes at least one match table 230. The match table 230 stores a set of rules for matching against one or more fields of the incoming PHV 205. Depending on the dependency of the current stage to the previous stage, the input PHV 205 to the current stage may be the input PHV or the output PHV of the previous stage. If any of the PHV fields that are being matched in the current stage (either by the message-processing stage match unit 235 or the snapshot match unit 270) are modified by the previous stage, then the current stage has to wait for the output PHV of the previous stage. If, on the other hand, none of the PHV fields that are being matched in the current stage are being modified by the previous stage, the current stage receives the input PHV of the previous stage.

Each rule in the match table(s) 230 has an associated action that the match table outputs when the PHV is matched to that rule (as shown by 232). The match unit compares one or more fields in a received message's header to identify flow entries in one or more match tables 230 to identify one or more matching flow entries (i.e., entries that match the message's header values), while the action unit performs the action or actions of the identified flow entries.

The output of the match table 230 forms the action data sent to the action unit 245. The action unit 245 includes an action memory 242, an instruction memory 243, and an action arithmetic logic unit (ALU) 244. The actions performed by the action unit 245 of the MAU include actions that the forwarding element has to perform on a received data message to forward it to its destination compute node or to other intervening forwarding elements.

The action ALU 244 executes instructions from the instruction memory 243 and performs actions described by the action memory 242 as well as by the action data provided by the match sub-unit 235. In some embodiments, the action ALU receives the PHV 240 from the previous stage (or the parser if the stage is the first stage in the pipeline), and based on the action instructions that it receives, modifies this PHV when needed in order to effectuate a message forwarding operation. The output of the action ALU forms a derivative PHV (as shown by 247) for the next match-action stage (or to the deparser 135 if the stage is the last stage in the pipeline). The action unit may change the PHV by changing one or more fields of the PHV or may send out the PHV unchanged.

As shown in FIG. 2, in addition to the MAU 150, the message-processing stage 145 of some embodiments includes snapshot debug hardware circuits 190 that include a snapshot match unit 270 and a snapshot capture unit 255. The processor 180 (shown in FIG. 1) enables and arms snapshots by loading (as shown by 280) matching criteria in the snapshot match unit 270, setting the state of the snapshot circuitry (as shown by 285) to trigger by a match in the current stage, trigger by a match in a previous stage, or both. The processor also enables the snapshot capture unit 255 by reading (as shown by 287) previously captured data and/or rearming (as shown by 289) the snapshot capture unit to capture data next time the match criteria is met. Details of these operations are described further below.

Snapshot match unit 270 detects the match condition by comparing the matching criteria with a set of fields of an incoming data message (as shown by the PHV 281) and triggers (as shown by 265) the data capture snapshot. The snapshot capture unit 255 captures (as shown by 290) some or all fields of the PHV (i.e., the header fields of the data message being processed by the MAU 150). The snapshot match unit 270 notifies the processor by generating an interrupt (as shown by 292) when a snapshot occurs. As described further below, the snapshot match unit 270 also sends (as shown by 288) a trigger signal to the message-processing stage match unit 235 to capture data plane state information that includes the state of a set of data plane registers or memory locations. The MAU capture unit 295 captures the MAU state. The processor reads (as shown by 297) the MAU captured data, e.g., through a set of configuration register reads.

Examples of the data plane state information captured by the message-processing stage match unit 235 upon receiving the trigger signal 288 include match table match address, match table hit signals (i.e., which TCAM/exact match tables hit or missed), table execution information (i.e., which tables executed their actions for this packet), table pointer to downstream MAU stages indicating what is the next message-processing stage table to execute for this packet, and message-processing stage error output (this is an error indication to the Deparser to drop the packet).

The snapshot capture unit in some embodiments includes a set of read/writable registers to store the snapshots. Each of these registers is zeroed out on reset in order to contain known values before the first snapshot is taken. It should be understood that the snapshot match unit 270 and the message-processing stage match unit 235 provide different functionalities. The message-processing stage match unit 235 is a part of the message-processing pipeline of the forwarding element and is used to match a set of fields of a data message in PHV in order to determine whether a corresponding action (such as modifying the PHV, forwarding the data message to a particular destination, dropping the data message, etc.) has to be applied to the data message.

The snapshot match unit 270, on the other hand, is part of the snapshot debug circuitry, which is activated and deactivated by the processing in the control plane. The match criteria used in the snapshot match unit 270 may or may not be the same criteria as the match criteria used in the message-processing stage match unit 235. A match detected by the snapshot match unit 270 results in the capture of a snapshot of the PHV and a set of signals in the data plane by the snapshot capture unit.

B. Arming the Snapshots

The snapshot circuitry for each message processing stage implements a finite state machine (FSM) in some embodiments. The FSM allows the processor in the control plane to configure each stage to (i) take a snapshot when the PHV of the stage meets a matching criteria, (ii) take a snapshot when the PHV of the previous stage meets a matching criteria, or (iii) take a snapshot when the PHV of the stage meets a matching criteria or the PHV of the previous stage meets a matching criteria.

Figure 3:
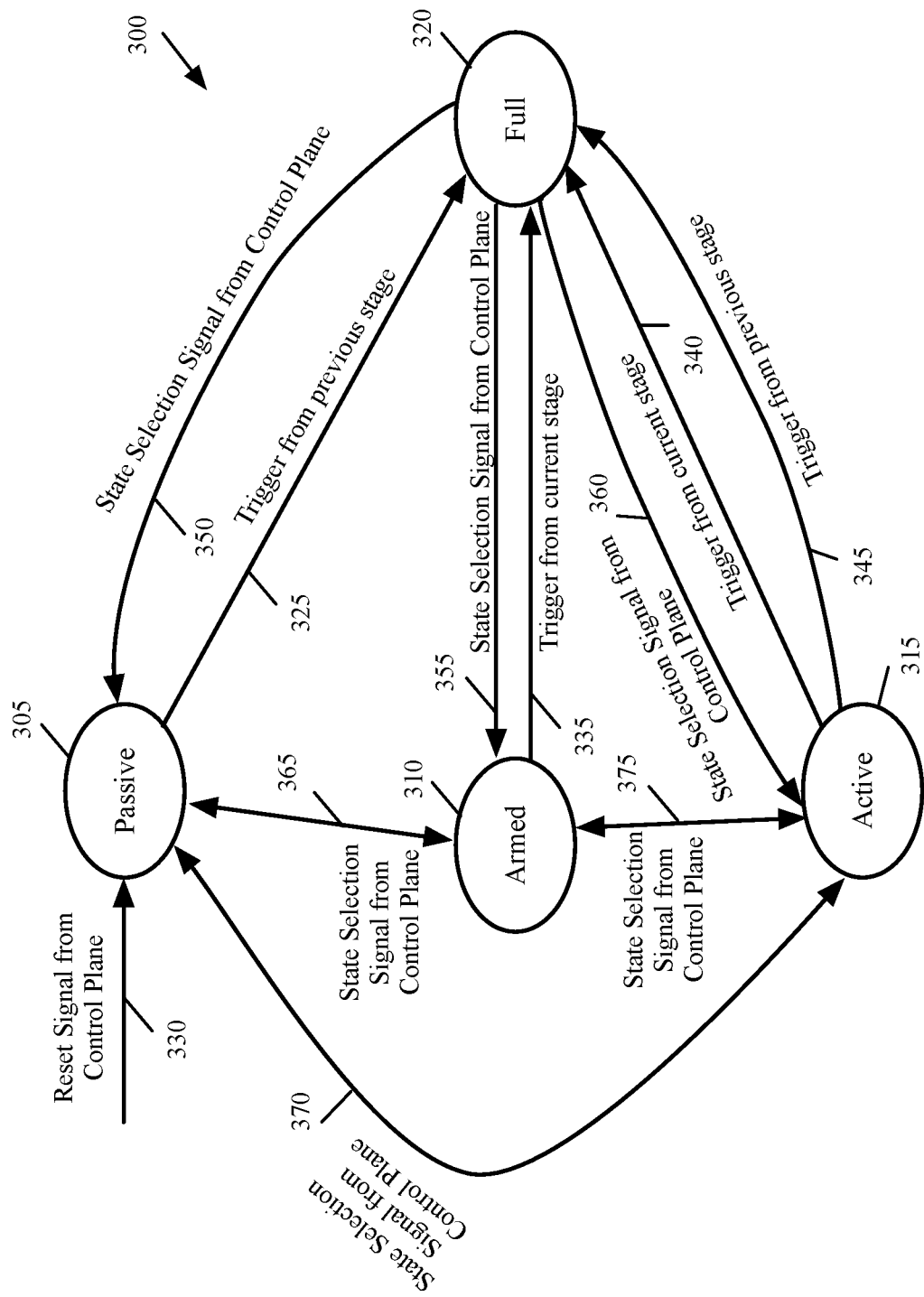
FIG. 3 conceptually illustrates the snapshot FSM for a message-processing stage in some embodiments.

FIG. 3 conceptually illustrates the snapshot FSM 300 for a message-processing stage in some embodiments. As shown, the FSM includes four states: passive 305, armed 310, active 315, and full 320. Each MAU stage can trigger a snapshot using the PHV ternary match (i.e., a match that may include "don't care" bits) or a time-based mechanism. In addition, each MAU stage in some embodiments has an FSM which allows the stage to accept a trigger from the previous stage. In this way, one stage can trigger a snapshot, and it and all subsequent connected stages will snapshot the packet.

The snapshot circuitry in some embodiments includes several snapshot data registers to capture snapshot data from the PHV as well as snapshot data from different signals in the data plane. In the passive state 305, the snapshot data registers are considered empty and available to load captured data anytime a snapshot occurs. When the snapshot circuitry in a stage is in the passive state, the snapshot circuitry accepts a trigger from the previous stage (as shown by 325). However, the snapshot circuitry in the passive state cannot trigger a snapshot itself. In other words, there are no matching criteria for the stage itself but a snapshot triggered in a previous stage also triggers the snapshot in the current stage.

In some embodiments, the default (or reset) state for the FSM in all stages is the passive state. In these embodiments, a reset signal (as shown by 330) places the snapshot circuitry of the message-processing stage in passive state 305

When the snapshot circuitry of a message-processing stage is in the armed state 310, the snapshot circuitry in the stage can trigger (as shown by 335) a snapshot. However, the snapshot circuitry in the armed state cannot accept snapshots from the previous stages. In the active state 315, the snapshot circuitry can trigger a snapshot by itself based on a condition that is met in the current stage (as shown by 340). The snapshot circuitry can also accept a trigger from the previous stage (as shown by 345). In the active state 315, snapshots can be triggered by either the current stage or the previous stages.

As shown, when a snapshot is triggered in any of the states 305-315, the snapshot FSM moves to the full state 320. In the full state 320, the snapshot data registers contain data. Further snapshots for the stage are disabled when the FSM is in full state 320. The processor in the control plane can choose to read or ignore any snapshot data in each data plane stage. There is no requirement for the processor to read the data. The processor changes state from full 320 to one of the other three states 305-315 (as shown by 350-360).

The processor can change state (as shown by 365-375) among passive 305, armed 310, and active 315 states at any time. For instance, the process can turn off snapshot trigger generation for a stage at any time by changing the state from armed 310 or active 315 to passive 305. The processor in some embodiments can change the FSM state on the same clock cycle as a snapshot event.

Resetting the state to passive 305 in each stage makes the stage ready for the next snapshot. It should be understood that there must be at least one stage with its snapshot FSM in the armed or active state in order for any snapshots to occur. Any stage in the passive state simply passes enabling back to an earlier stage. As an example, when the snapshot circuitry in the first stage triggers a snapshot, the snapshot propagates to all stages. When the processor is notified that the first stage has triggered a snapshot, the processor iterates forward through the message-processing stages reading the snapshot FSM state.

As long as the state indicates full, the processor reads any desired data and continues on to the next stage. Finally, after reading out data from the last stage involved, the processor can change that stage's state to passive. The processor can then return backwards through the stages and set all stages to the same state. Alternatively, the processor can set each stage to passive immediately after reading the stage's captured data. Finally, the processor sets stage 1 to armed or active rather than passive.

The snapshot data register in some embodiments is not cleared when the processor reads the contents of the register or when the FSM is rearmed from full to any of the passive, armed, or active states. Instead, the FSM overwrites the previous contents of the data register upon the next triggered snapshot (e.g., the FSM is in the passive state or active state and a trigger signal from the previous state is reviewed, the FSM is in the armed state or active state and a match criteria is met, or the FSM is in the armed state or active state and a timer-based trigger signal is received). Once the control plane has read the contents of the snapshot data register and then rearmed the FSM, the contents are assumed to be stale until the next triggered snapshot.

The snapshot circuitry in each stage includes a set of snapshot configuration registers to configure different operations and states of the snapshot circuitry. The snapshot circuitry maintains the FSM state for each stage by using two bits in a snapshot configuration register that is both writable and readable by the processor. These two bits are also updated after snapshots are triggered in order to change the state from passive 305, armed 310, or active 315 states to full state 320. The processor normally does not update the FSM state when a snapshot may occur. However, if a processor write and a snapshot occur at the same time, the processor-initiated write receives priority in updating the state.

The FSM 300 allows a single snapshot involving all stages, separate snapshots in each stage, separate snapshots in groups of stages, or separate snapshots in some stages and separate snapshots in one or more groups of stages. There can also be separate snapshots per ingress or egress threads.

The snapshot triggers in some embodiments are passed between stages on a snapshot trigger signal. A snapshot trigger received from a previous stage is only propagated to the next stage when the current stage's FSM is in the passive state (as shown by 325) or active state (as shown by 345). A snapshot triggered by the current stage is always propagated to the next stage. In other words, if a stage is capturing a snapshot (triggered by its own stage or a previous stage depending on the stage's FSM state) then the stage propagates the trigger to the next stage and the next stage will capture depending on the next stage's own FSM state.

Some embodiments set a first read-only bit in a snapshot configuration register when a snapshot is captured to indicate the snapshot was triggered from the stage. These embodiments set a second read-only bit in the snapshot configuration register to indicate the snapshot captured in the stage was triggered from the previous stage. When a stage has an internal trigger and also enables triggers from the previous stage, then both bits are set if both triggers occur in the same clock cycle.

C. Snapshot Triggering Based on PHV Content

Figure 4:
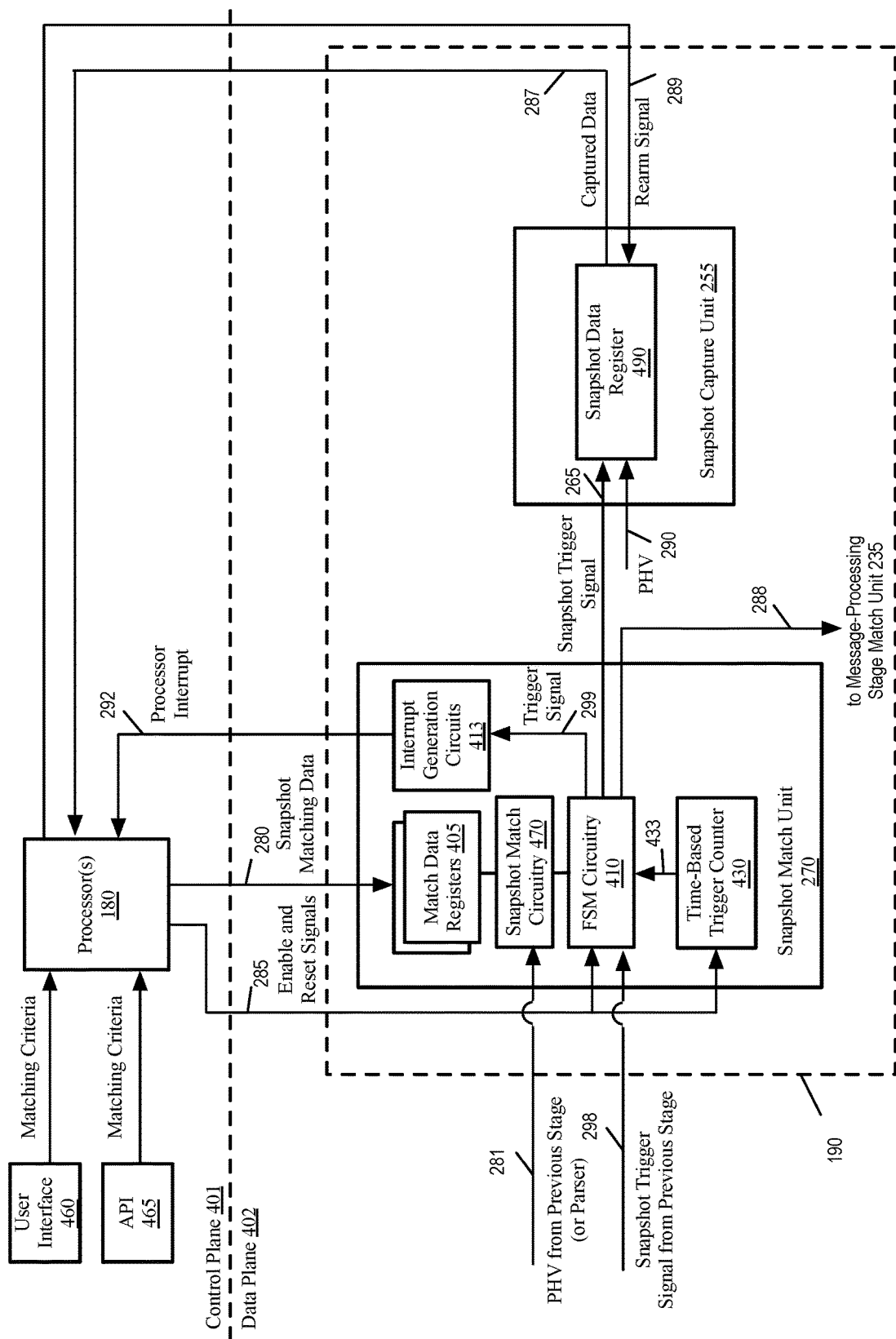
FIG. 4 conceptually illustrates further details of the snapshot circuitry of some embodiments.

The snapshots in some embodiments are triggered either when a PHV matches the matching criteria or when a counter-based time out expires. FIG. 4 conceptually illustrates further details of the snapshot circuitry 190 of some embodiments. As shown, the snapshot match unit 270 includes a set of match data registers (referred to as PHV ternary match registers) 405, snapshot match circuitry 470 to perform a match between a set of PHV fields and the match criteria stored in the match data registers 405, FSM circuitry 410 to implement the FSM 300 as described above by reference to FIG. 3, and a time-based trigger counter 430.

The match data registers 405 receive (as shown by 280) snapshot matching data (or matching criteria) from the processor 180. The snapshot matching data in some embodiments has the same format and width as the PHV (i.e., as the header of each data message being processed). For instance, if the PHV has 4K bits and 224 fields, each of the match data registers has 4K bits and 224 fields. The matching data can include "don't care" bits, which correspond to the bits (or fields) in the PHV that are not compared to the PHV data.

In order to implement the "don't care" bits, some embodiments include two match data registers 405. One register to include the data to match (including the "don't care" bits) and the other register to act as a mask to identify the "don't care" bits in the first register. For instance, a bit with logical "0" value in the second match data register may indicate a "don't care" bit in the corresponding bit position in the first register in some embodiments. Alternatively, in other embodiments, a bit with logical "1" value in the second match data register may indicate a "don't care" bit in the corresponding bit position in the first register.

For instance, an 8-bit ternary value of 01101XXX (i.e., the first register including 01101 with three "don't care" bits and the mask in the second register indicating that the last three bits of the first register are "don't care" bits), matches any of the values 01101000, 01101001, 01101010, 01101011, 01101100, 01101101, 01101110, and 01101111.

In some embodiments, the processor loads the snapshot matching data in the first match data register (the data register) and the corresponding mask in the second data register (the mask register) for the snapshot circuitry of each message-processing stage of the forwarding element. Based on the user input, e.g., through a user interface 460 or an application programming interface (API) 465, the processor 180 sets the matching values for one or more fields of the PHV. The fields that are not used in the matching criteria are left as "don't care".

The control plane and the data plane in some embodiments communicate through a PCI Express (peripheral component interconnect express or PCIe) bus. The control plane in some embodiments utilizes direct memory access (DMA) to load data into the data plane. For instance, the process in some embodiments uses DMA to load the snapshot matching data into match data registers 405.

The snapshot in some embodiments is triggered by examining the entire PHV subject to the "don't care" bits in the mask register. In embodiments that the physical resources of a message-processing stage may be divided between the ingress and egress pipelines, snapshots for each thread (ingress or egress) are independently enabled and captured. However, the snapshots can be linked such that a snapshot in either will trigger snapshotting both. The linking of the two snapshots is done in some embodiments by setting a configuration field in one of the configuration registers. The linking may be useful in lower level debug situations in case of unplanned interactions between threads.

D. Snapshot Time-Based Triggering

Some embodiments provide a snapshot trigger based on time. These embodiments include a time-based trigger mechanism in each message-processing stage. The time-based snapshot is enabled by the processor via a configuration register. After the time-based snapshot is enabled, a counter 430 (e.g., an 48-bit counter) starts counting. This counter is read/writable via the processor to allow for resetting the counter after a time-based snapshot has occurred. The processor controls the amount of time before a trigger by loading a value to count down in the counter 430.

When the counter reaches the configurable trigger time, a signal 433 is sent to the FSM circuitry 410. The FSM circuitry 410 ignores the signal 433 if the FSM is in the full state 320 (as shown in FIG. 3). Otherwise, a snapshot is triggered (as shown by 265) and an interrupt is generated to the processor (as shown by 299 and 292) on the next incoming PHV. Time-based snapshot can be enabled in addition to the PHV ternary match trigger 265. If a PHV match triggers a snapshot, a later time-based snapshot is ignored if the processor has not already reset the snapshot FSM to capture data. As described above by reference to FIG. 3, the processor changes the FSM state from full 320 to any of the other three states 305-315 in order for the snapshot capture unit to capture PHV data on the next trigger signal from the snapshot match unit.

E. Snapshot Data Capture

The snapshot capture unit 255 includes a snapshot data register 490. The data register 490 captures snapshot data from the PHV 290 once a trigger signal 265 is received from the snapshot match unit 270. The trigger signal 265 is generated by the FSM circuitry 410 under different conditions. First, (i) when snapshot match circuitry 470 detects a match condition by comparing the matching criteria stored in match data registers 405 with a set of fields of an incoming data message (as shown by the PHV 281) and (ii) the FSM is in one of the states (i.e., armed state or active state as shown in FIG. 3) that allows snapshot trigger from the current stage, the FSM circuitry 410 triggers (as shown by 265) the data capture snapshot.

Second, if (i) snapshot match circuitry 470 receives a snapshot trigger signal 298 from the previous stage and (ii) the FSM is in one of the states (i.e., passive state or active state as shown in FIG. 3) that allows snapshot trigger from a previous stage, the FSM circuitry 410 triggers (as shown by 265) the data capture snapshot. Third, upon the expiration of the count down timer implemented by the time-based trigger counter 430, a signal 433 is sent to the FSM circuitry 410. If the FSM is in one of the states (i.e., armed state or active state as shown in FIG. 3) that allows snapshot trigger from the current stage, the FSM circuitry 410 triggers (as shown by 265) the data capture snapshot.

The FSM circuitry 410 does not generate a trigger signal 265 if the FSM is in full state (as shown in FIG. 3). Once a snapshot trigger signal 265 is sent to snapshot capture unit 255, the FSM circuitry 410 also sends the trigger signal 299 to the interrupt generation circuits 413 to generate an interrupt 292 to the processor 180.

As described above by reference to FIG. 2, PHV 290 is the output PHV of the current message-processing stage. Once the processor 180 receives an interrupt (as shown by 292), the processor can choose to read (as shown by 287) or ignore any snapshot data. Similarly, the processor can choose to read data 297 captured by the MAU capture unit 295 (as shown in FIG. 2). The processor can also turn off (or on) snapshot trigger generation for a stage at any time by changing (as shown by 285) the state from armed or active to passive (as described above by reference to FIG. 3). In some embodiments, snapshot capture unit 255 does not overwrite captured data until the processor rearms (as shown by 289) the snapshot data registers.

As shown by 288 and described above by reference to FIG. 2, the trigger signal generated by the snapshot match unit 270 is also sent to the MAU capture unit 295 of message-processing stage match unit 235. When the message-processing stage match unit 235 receives the trigger signal, the message-processing stage match unit stores the internal state of the data plane by saving the state of one or more registers, memory locations, and/or signals of the data plane.

Examples of the data plane state information captured by the message-processing stage match unit include match table match address, match table hit signals (i.e., which TCAM/ exact match tables hit or missed), table execution information (i.e., which tables executed their actions for this packet), table pointer to downstream MAU stages indicating what is the next message-processing stage table to execute for this packet, and message-processing stage error output (this is an error indication to the Deparser to drop the packet).

Figure 5A:
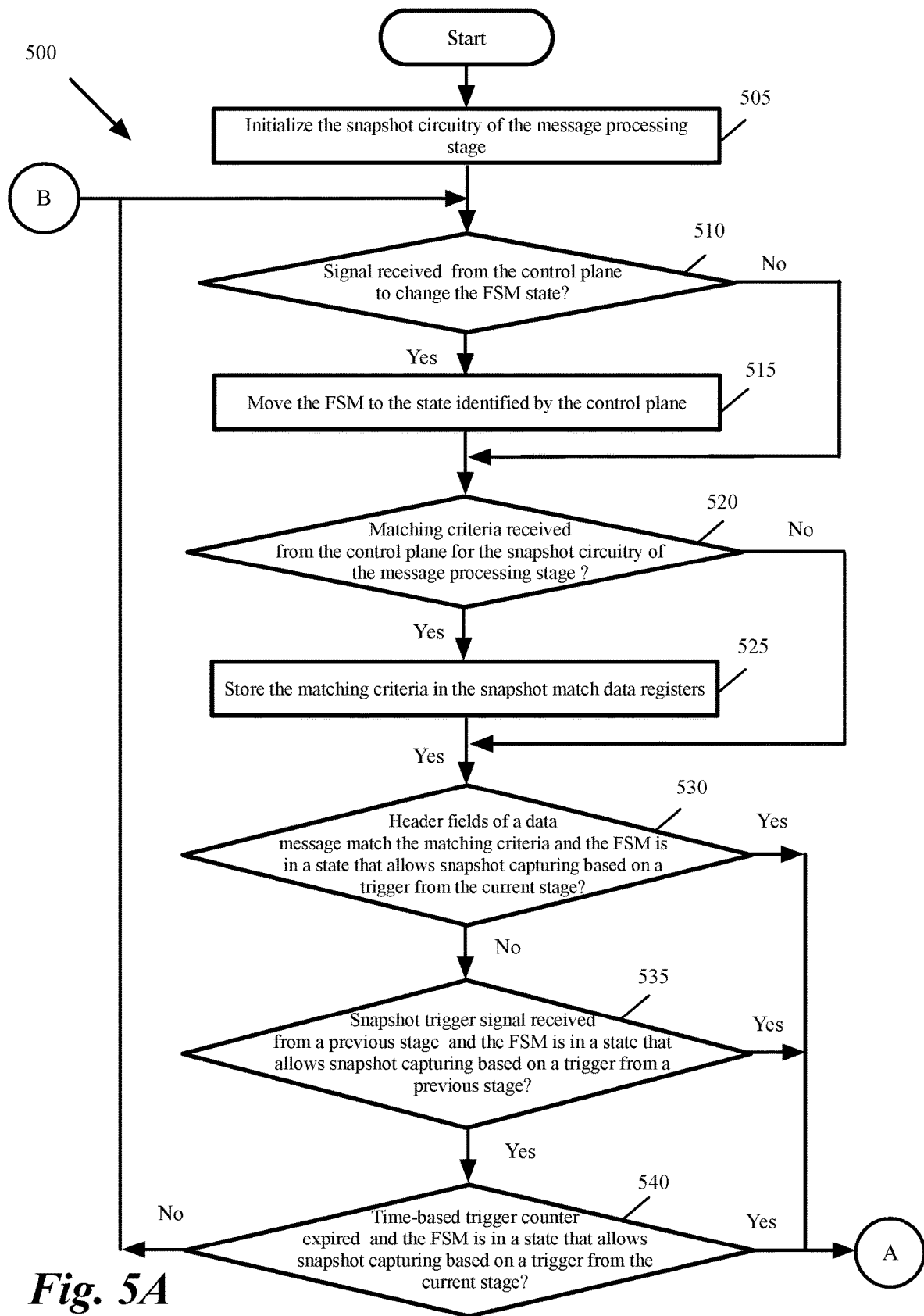
FIGS. 5A-5B conceptually illustrate a process for capturing data plane snapshots for a forwarding element in some embodiments.
Figure 5B:
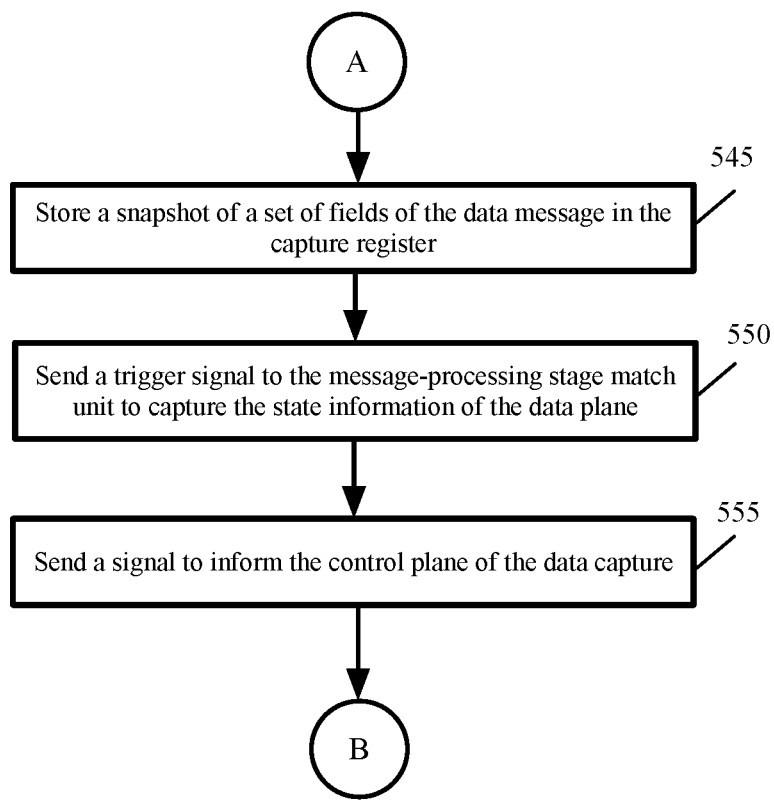

FIGS. 5A-5B conceptually illustrate a process 500 for capturing data plane snapshots in a message processing stage of a forwarding element in some embodiments. The process in some embodiments is performed by the snapshot debug circuitry 190 shown in FIGS. 2 and 4.

As shown, the process initializes (at 505) the snapshot circuitry of the message processing stage. For instance, the process in some embodiments stores an initial match criteria in the match data registers 405 in FIG. 4 and sets the FSM to one of the states 305-320 shown in FIG. 3.

The process then determines (at 510) whether a signal is received from the control plane to change the FSM state. If not, the process proceeds to 520, which is described below. Otherwise, the process moves (at 515) the FSM to the state identified by the control plane. For instance, The FSM may be initialized to passive state 305 in operation 505 and then the control plane may set the FSM to a different state such as armed state 310 or active state 315 as shown in FIG. 3.

The process then determines (at 520) whether a matching criteria is received from the control plane for the snapshot circuitry of the message processing unit. For instance, the control plane may send a new matching criteria to match data registers 405 based on an input received from the user interface 460, an input received from the API 465 in FIG. 4. If not, the process proceeds to 530, which is described below. Otherwise, the process stores (at 525) the matching criteria in the snapshot match data registers.

The process then determines (at 530) whether (i) the header fields of a data message received at the message processing stage match the matching criteria and (ii) the FSM is in a state that allows snapshot capturing based on a trigger signal from the current stage. For instance, the process determines whether the PHV 281 matches the snapshot matching criteria stored in match data registers 405 in FIG. 4 and the FSM is in the active state 315 or the armed state 310 as shown in FIG. 3. If yes, the process proceeds to 545, which is described below.

Otherwise, the process determines (at 535) whether (i) a snapshot trigger signal is received from a previous stage and (ii) the FSM is in a state that allows snapshot capturing based on a trigger signal from a previous stage. For instance, the process determines whether a snapshot trigger signal 298 from a previous message processing stage is received at the FSM circuitry 410 as shown in FIG. 4 and the FSM is in the passive state 305 or the active state 315 as shown in FIG. 3. If yes, the process proceeds to 545, which is described below.

Otherwise, the process determines (at 540) whether (i) the time-based trigger counter has expired and (ii) the FSM is in a state that allows snapshot capturing based on a trigger signal from the current stage. For instance, the process determines whether the time-based trigger counter 430 has generated signal 433 in FIG. 4 and the FSM is in the active state 315 or the armed state 310 as shown in FIG. 3. If not, the process proceeds to 510, which was described above to wait for another event.

Otherwise, the process stores (at 545) a set of fields of the data message. For instance, the snapshot match unit 270 sends the trigger signal 265 to snapshot capture unit 255 to store PHV data 290 in snapshot register 490. In some embodiments, the process stores every field of the PHV. In other embodiments, a predetermined set of fields from the PHV is stored in the snapshot register.

The process also sends (at 550) a trigger signal to the message-processing stage match unit 235 to capture the state information of the data plane. For instance, the process sends a signal 288 to message processing stage match unit 235 as shown in FIGS. 2 and 4 to capture the state of different registers, signals, and/or memory locations of the message-processing stage.

The process sends (at 555) a signal to inform the control plane of the data capture. For instance, the process generates an interrupt to the processor 180 by the interrupt generation circuits 413 as shown by 292 in FIG. 4. The process then proceeds to 510, which was described above to wait for the next event.

It should also be understood that the operations of process 500 are performed by hardware and firmware in the data plane. Several operations may be performed asynchronously and out of the particular order shown in FIGS. 5A-5B. For instance, operations 510-515, 520-525, 530 and 545-555, 535 and 545-555, or 540-555 may be performed in a different sequence and/or asynchronously from each other.

II. Computer System

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
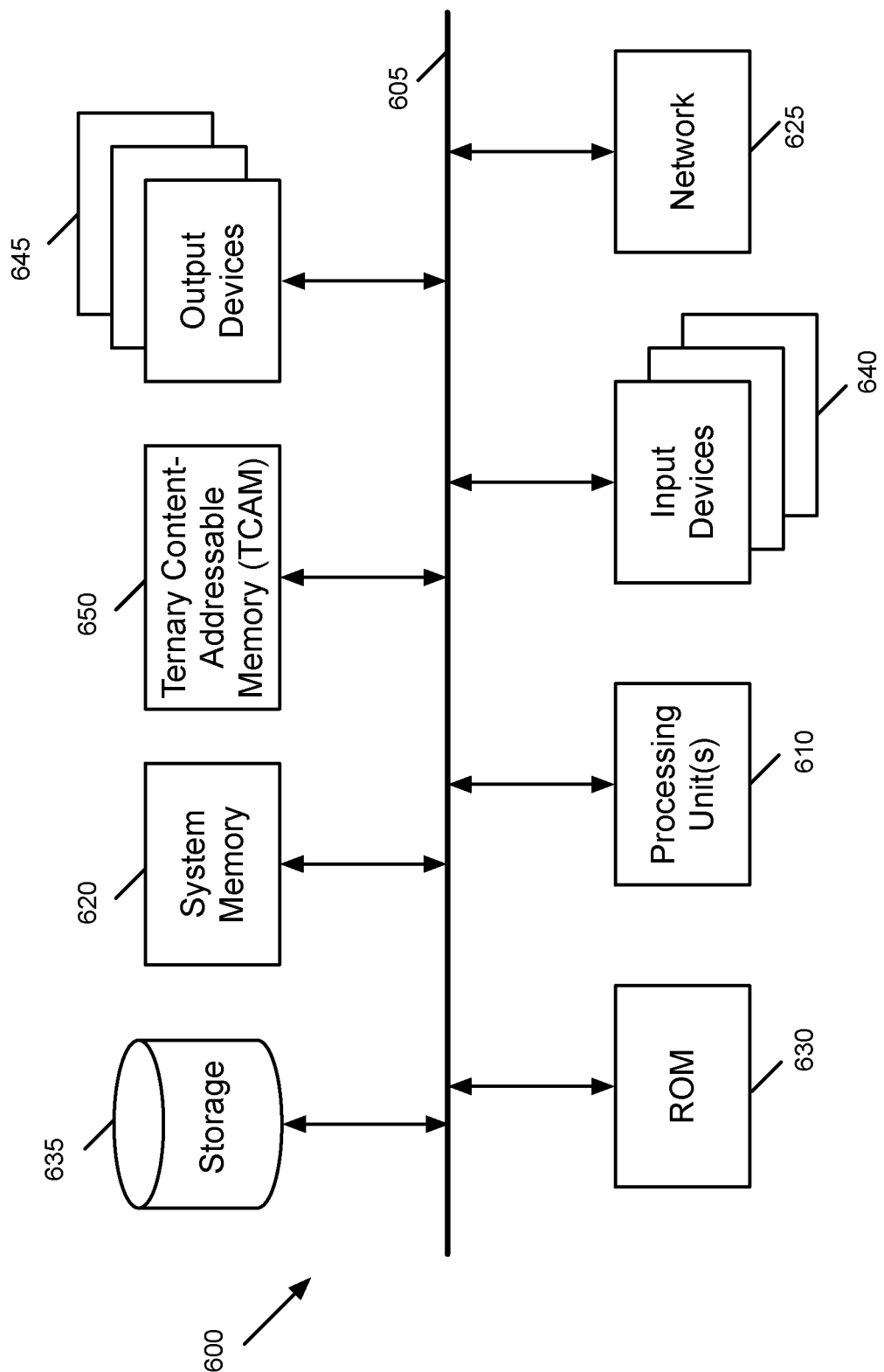
FIG. 6 conceptually illustrates an electronic system with which some embodiments of the invention are implemented.

FIG. 6 conceptually illustrates an electronic system 2400 with which some embodiments of the invention such as the forwarding elements, routers, switches, etc., are implemented. The electronic system 2400 can be used to execute any of the control, virtualization, or operating system applications described above. The electronic system 2400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2400 includes a bus 2405, processing unit(s) 2410, system memory 2420, read-only memory (ROM) 2430, permanent storage device 2435, input devices 2440, output devices 2445, and TCAM 2450.

The bus 2405 collectively represents all system, peripheral, and chipset buses that communicatively connect the numerous internal devices of the electronic system 2400. For instance, the bus 2405 communicatively connects the processing unit(s) 2410 with the read-only memory 2430, the system memory 2420, and the permanent storage device 2435.

From these various memory units, the processing unit(s) 2410 retrieve instructions to execute and data to process in order to execute the processes of the invention. The processing unit(s) may be a single processor or a multi-core processor in different embodiments.

The read-only-memory 2430 stores static data and instructions that are needed by the processing unit(s) 2410 and other modules of the electronic system. The permanent storage device 2435, on the other hand, is a read-and-write memory device. This device is a non-volatile memory unit that stores instructions and data even when the electronic system 2400 is off. Some embodiments of the invention use a mass-storage device (such as a magnetic or optical disk and its corresponding disk drive) as the permanent storage device 2435.

Other embodiments use a removable storage device (such as a floppy disk, flash drive, etc.) as the permanent storage device. Like the permanent storage device 2435, the system memory 2420 is a read-and-write memory device. However, unlike storage device 2435, the system memory is a volatile read-and-write memory, such as random access memory. The system memory stores some of the instructions and data that the processor needs at runtime. In some embodiments, the invention's processes are stored in the system memory 2420, the permanent storage device 2435, and/or the read-only memory 2430. From these various memory units, the processing unit(s) 2410 retrieve instructions to execute and data to process in order to execute the processes of some embodiments.

The bus 2405 also connects to the input and output devices 2440 and 2445. The input devices enable the user to communicate information and select commands to the electronic system. The input devices 2440 include alphanumeric keyboards and pointing devices (also called "cursor control devices"). The output devices 2445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 6, bus 2405 also couples electronic system 2400 to a network 2425 through a network adapter (not shown). In this manner, the computer can be a part of a network of computers (such as a local area network ("LAN"), a wide area network ("WAN"), an Intranet, or a network of networks, such as the Internet). Any or all components of electronic system 2400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

In view of the foregoing, one of ordinary skill in the art would understand that the invention is not to be limited by the foregoing illustrative details, but rather is to be defined by the appended claims.

The invention claimed is:

1. A network forwarding element apparatus comprising:
a data plane; and
a message-processing pipeline comprising a snapshot debug circuitry to copy a snapshot of data for a data message processed by message processing stages in the data plane;

wherein:
   the snapshot debug circuitry is to store captured data from the snapshot and generate notification of occurrence of the snapshot;
   the snapshot debug circuitry is to maintain snapshot configuration data;
   the snapshot configuration data is processor-writable and processor-readable, at least in part;
   the snapshot debug circuitry is configurable to implement operations and states that are configurable based upon the snapshot configuration data;
   the states of the snapshot debug circuitry that are configurable based upon the snapshot configuration data include at least one state that corresponds to the snapshot debug circuitry being enabled for snapshot triggering based upon match conditions occurring at multiple of the message processing stages; and
   the snapshot configuration data is to be updated after the snapshot triggering.

2. The apparatus of claim 1, wherein the snapshot debug circuitry is to enable a snapshot, read out of captured data, and re-enable for a next capture.

3. The apparatus of claim 1, wherein the snapshot debug circuitry is to detect a condition which triggers the snapshot, store a set of data words captured in the snapshot, and notify a central processing unit (CPU) when a snapshot occurs.

4. The apparatus of claim 1, wherein the snapshot debug circuitry comprises a snapshot match unit and a snapshot capture unit.

5. The apparatus of claim 1, wherein a condition that triggers a snapshot comprises a set of header fields of a data message matching corresponding matching data.

6. The apparatus of claim 1, wherein a condition that triggers a snapshot comprises a previous snapshot triggering.

7. The apparatus of claim 1, wherein a condition that triggers a snapshot comprises a snapshot triggered based on timer being met.

8. The apparatus of claim 1, wherein the snapshot of data comprises packet header-related information.

9. The apparatus of claim 1, wherein the network forwarding element apparatus comprises one or more of: a switch or a router.

10. A method for debugging a data plane circuit, the method comprising:
   receiving one or more data messages; and
   in a message-processing pipeline, using a snapshot debug circuitry to copy a snapshot of data of a data message processed by message processing stages in the data plane;
wherein:
   the snapshot debug circuitry is to store captured data from the snapshot and generate notification of occurrence of the snapshot;
   the snapshot debug circuitry is to maintain snapshot configuration data;
   the snapshot configuration data is processor-writable and processor-readable, at least in part;
   the snapshot debug circuitry is configurable to implement operations and states that are configurable based upon the snapshot configuration data;
   the states of the snapshot debug circuitry that are configurable based upon the snapshot configuration data include at least one state that corresponds to the snapshot debug circuitry being enabled for snapshot triggering based upon match conditions occurring at multiple of the message processing stages; and
   the snapshot configuration data is to be updated after the snapshot triggering.

11. The method of claim 10, wherein the snapshot debug circuitry is to enable a snapshot, read out the captured data, and re-enable for a next capture.

12. The method of claim 10, further comprising:
   the snapshot debug circuitry detecting a condition which triggers the snapshot, storing a set of data words captured in the snapshot, and notifying a central processing unit (CPU) when a snapshot occurs.

13. The method of claim 10, wherein a condition that triggers a snapshot comprises a set of header fields of a data message matching corresponding matching data.

14. The method of claim 10, wherein a condition that triggers a snapshot comprises a previous snapshot triggering.

15. The method of claim 10, wherein a condition that triggers a snapshot comprises a snapshot triggered based on timer being met.

16. The method of claim 10, wherein the snapshot of data comprises packet header-related information.

17. The method of claim 10, wherein the data plane circuit is part of a network forwarding element and the network forwarding element comprises one or more of: a switch or a router.

* * * * *